US011138003B2

(12) United States Patent
Glazer et al.

(10) Patent No.: US 11,138,003 B2
(45) Date of Patent: Oct. 5, 2021

(54) METHODS AND SYSTEMS FOR AUTOMATIC DETERMINATION OF A DEVICE-SPECIFIC CONFIGURATION FOR A SOFTWARE APPLICATION OPERATING ON A USER DEVICE

(71) Applicant: Taplytics Inc., Toronto (CA)

(72) Inventors: Aaron Mosha Glazer, Toronto (CA); Jonathan Taylor Norris, Toronto (CA); Adam James Wootton, Toronto (CA); Imaad Ahmad Umar, West Vancouver (CA); Victor Nikola Vucicevich, Waterloo (CA)

(73) Assignee: Taplytics Inc., Toronto (CA)

( * ) Notice: Subject to any disclaimer, the term of this patent is extended or adjusted under 35 U.S.C. 154(b) by 0 days.

(21) Appl. No.: 16/837,341

(22) Filed: Apr. 1, 2020

(65) Prior Publication Data

US 2020/0319877 A1 Oct. 8, 2020

Related U.S. Application Data

(60) Provisional application No. 62/827,885, filed on Apr. 2, 2019.

(51) Int. Cl.
*G06F 11/30* (2006.01)
*G06N 20/00* (2019.01)
(Continued)

(52) U.S. Cl.
CPC .................. *G06F 8/71* (2013.01); *G06F 8/65* (2013.01); *G06F 11/302* (2013.01);
(Continued)

(58) Field of Classification Search
CPC ...... G06F 8/71; G06F 21/6254; G06F 11/302; G06F 11/3051; G06F 8/65; G06F 8/61;
(Continued)

(56) References Cited

U.S. PATENT DOCUMENTS 8,887,262 B1 * 11/2014 Turner .................. H04W 12/06
726/10
9,491,187 B2 * 11/2016 Sridhara ............. H04L 63/1408
(Continued)

FOREIGN PATENT DOCUMENTS

WO WO-2019235018 A1 * 12/2019 ............. G06N 20/00

*Primary Examiner* — Daxin Wu
(74) *Attorney, Agent, or Firm* — Bereskin & Parr LLP/S.E.N.C.R.L., s.r.l.

(57) ABSTRACT

A method and system for automatically determining a device-specific configuration for a software application operating on a user device. A configuration monitoring program monitors local user data stored on a user device and generates a device-specific prediction model using a machine learning algorithm applied to the monitored local data. The configuration monitoring program also receives a global prediction model generated remotely using global user data collected from a plurality of user devices. The configuration monitoring program generates a predicted device-specific configuration of the application operating on the user device using prediction data from both the device-specific prediction model and the global prediction model and updates the configuration of the given application using the predicted device-specific configuration.

28 Claims, 9 Drawing Sheets

(51) Int. Cl.
*G06F 8/71* (2018.01)
*G06N 5/04* (2006.01)
*G06F 21/62* (2013.01)
*G06F 8/65* (2018.01)
*G06F 8/61* (2018.01)

(52) U.S. Cl.
CPC ...... *G06F 11/3051* (2013.01); *G06F 21/6254* (2013.01); *G06N 5/04* (2013.01); *G06N 20/00* (2019.01); *G06F 8/61* (2013.01)

(58) Field of Classification Search
CPC ...... G06F 9/44505; G06N 5/04; G06N 20/00; G06N 20/20
See application file for complete search history.

(56) References Cited

U.S. PATENT DOCUMENTS

| | | | |
|---|---|---|---|
| 2014/0237595 A1* | 8/2014 | Sridhara | G06F 21/55 726/23 |
| 2015/0242760 A1 | 8/2015 | Miao et al. | |
| 2015/0347907 A1* | 12/2015 | Mathew | G06N 5/043 706/12 |
| 2017/0109322 A1 | 4/2017 | McMahan et al. | |
| 2018/0018590 A1 | 1/2018 | Szeto et al. | |

* cited by examiner

METHODS AND SYSTEMS FOR AUTOMATIC DETERMINATION OF A DEVICE-SPECIFIC CONFIGURATION FOR A SOFTWARE APPLICATION OPERATING ON A USER DEVICE

CROSS-REFERENCE TO RELATED APPLICATIONS

This application claims the benefit of U.S. Provisional Application No. 62/827,885 filed on Apr. 2, 2019, which is incorporated by reference herein in its entirety.

FIELD

The described embodiments relate to managing configurations for software applications, and in particular, to methods and systems for automatically selecting the configuration of a software application operating on a user device.

BACKGROUND

The following is not an admission that anything discussed below is part of the prior art or part of the common general knowledge of a person skilled in the art.

United States Publication No. 2017/0109322A1 of McMahan et al. purports to disclose systems and methods of determining a global model. In particular, one or more local updates can be received from a plurality of user devices. Each local update can be determined by the respective user device based at least in part on one or more data examples stored on the user device. The one or more data examples stored on the plurality of user devices are distributed on an uneven basis, such that no user device includes a representative sample of the overall distribution of data examples. The local updates can then be aggregated to determine a global model.

United States Publication No. 2018/0018590A1 of Szeto et al. purports to disclose a distributed, online machine learning system. Contemplated systems include many private data servers, each having local private data. Researchers can request that relevant private data servers train implementations of machine learning algorithms on their local private data without requiring de-identification of the private data or without exposing the private data to unauthorized computing systems. The private data servers also generate synthetic or proxy data according to the data distributions of the actual data. The servers then use the proxy data to train proxy models. When the proxy models are sufficiently similar to the trained actual models, the proxy data, proxy model parameters, or other learned knowledge can be transmitted to one or more non-private computing devices. The learned knowledge from many private data servers can then be aggregated into one or more trained global models without exposing private data.

United States Publication No. 2015/0242760A1 of Miao et al. purports to disclose machine learning that may be personalized to individual users of computing devices, and can be used to increase machine learning prediction accuracy and speed, and/or reduce memory footprint. Personalizing machine learning can include hosting, by a computing device, a consensus machine learning model and collecting information, locally by the computing device, associated with an application executed by the client device. Personalizing machine learning can also include modifying the consensus machine learning model accessible by the application based, at least in part, on the information collected locally by the client device. Modifying the consensus machine learning model can generate a personalized machine learning model. Personalizing machine learning can also include transmitting the personalized machine learning model to a server that updates the consensus machine learning model.

SUMMARY

The following introduction is provided to introduce the reader to the more detailed discussion to follow. The introduction is not intended to limit or define any claimed or as yet unclaimed invention. One or more inventions may reside in any combination or sub-combination of the elements or process steps disclosed in any part of this document including its claims and figures.

In accordance with one aspect of this disclosure, which may be used alone or in combination with any other aspect, there is provided a method for automatically determining a device-specific configuration for a given application operating on a user device, the user device having a processor, a non-transitory memory and a configuration monitoring program stored in the non-transitory memory. The method can include: installing a configuration monitoring program on the user device, the configuration monitoring program including a device-specific configuration prediction model; monitoring, by the configuration monitoring program, local user data stored in the non-transitory memory of the user device; generating, by the configuration monitoring program on the user device, a device-specific configuration prediction model, where the device-specific configuration prediction model is generated using a machine learning algorithm applied to the monitored local data; receiving, by the configuration monitoring program on the user device, a global configuration prediction model, where the global configuration prediction model is generated remotely using global user data collected from a plurality of user devices; defining, by the configuration monitoring program, a predicted device-specific configuration of the given application operating on the user device by: generating, by the configuration monitoring program using the device-specific configuration prediction model, a local prediction of the device-specific configuration; generating, by the configuration monitoring program using the global configuration prediction model, a global prediction of the device-specific configuration; and generating, by the configuration monitoring program, the predicted device-specific configuration of the given application using the local prediction of the device-specific configuration and the global prediction of the device-specific configuration; and updating the configuration of the given application using the predicted device-specific configuration.

In some embodiments, the method may include: monitoring, by the configuration monitoring program, device activity of the user device; identifying, by the configuration monitoring program, that configuration update criteria have been satisfied based on the device activity; and updating the configuration of the given application using the predicted device-specific configuration, in response to identifying that the configuration update criteria have been satisfied.

In some embodiments, the method may include: defining, by the configuration monitoring program, the predicted device-specific configuration in response to identifying that the configuration update criteria have been satisfied.

In some embodiments, the global user data includes anonymized aggregate data collected from a plurality of user devices while omitting personally identifiable information.

In some embodiments, the configuration monitoring program can be installed on a plurality of user devices, and the method includes: transmitting a query to the plurality of user devices, where the query includes a request for aggregate local user data; receiving, from the configuration monitoring program operating on each of the plurality of user devices, respective aggregate local user data generated locally by the configuration monitoring program on each user device from the local data stored on that user device; and combining the aggregate local user data received from the plurality of user devices to generate global aggregate user data.

In some embodiments, the configuration monitoring program on each user device is configured to generate model weights for the device-specific configuration prediction model, and the aggregate local user data received from the plurality of user devices includes the model weights.

In some embodiments, the method may include: monitoring, by the configuration monitoring program, a user feedback input corresponding to the configuration of the given application; and updating the device-specific configuration prediction model using data corresponding to the user feedback input.

In some embodiments, the method may include: determining, by the configuration monitoring program, a local model prediction metric using the local prediction of the device-specific configuration and the user feedback input.

In some embodiments, the local model prediction metric is determined by the configuration monitoring program using historical metric results.

In some embodiments, generating the predicted device-specific configuration of the given application, includes: determining whether the local prediction metric is above a predetermined performance threshold; and when the local prediction metric is above the predetermined performance threshold, generating the predicted device-specific configuration of the given application entirely from the local prediction and giving the global prediction no weight, otherwise generating the predicted device-specific configuration of the given application entirely from the global prediction and giving the local prediction no weight.

In some embodiments, generating the predicted device-specific configuration of the given application includes: assigning a first bias weight to the local prediction, where the first bias weight is based on the local prediction metric; assigning a second bias weight to the global prediction; and generating the predicted device-specific configuration by combining the local prediction and the global prediction according to the first and second bias weights, respectively.

In some embodiments, the method may include: determining whether the local prediction metric is above a predetermined performance threshold; and generating the predicted device-specific configuration using only the global prediction if the local prediction metric is below the predetermined performance threshold, otherwise generating the predicted device-specific configuration by combining the local prediction and the global prediction weighted according to the first and second bias weights respectively.

In some embodiments, the global data includes a plurality of default configured outcomes.

In some embodiments, the configuration monitoring program automatically updates the configuration of the given application using the predicted device-specific configuration.

In accordance with one aspect of this disclosure, which may be used alone or in combination with any other aspect, there is provided a system for automatically determining a device-specific configuration for a given application operating on a first user device, the system including: a plurality of user devices including the first user device, each user device having a processor, a non-transitory memory and a configuration monitoring program stored in the non-transitory memory; a server in communication with the plurality of user devices, where the server is configured to: collect global user data from the plurality of user devices; and generate a global configuration prediction model using the global user data; and the first user device is configured by the configuration monitoring program to: monitor local user data stored in the non-transitory memory of the first user device; generate a device-specific configuration prediction model, where the device-specific configuration prediction model is generated using a machine learning algorithm using the monitored local data; receive the global configuration prediction model from the server; define a predicted device-specific configuration of the given application operating on the first user device by: generating, using the device-specific configuration prediction model, a local prediction of the device-specific configuration; generating, using the global configuration prediction model, a global prediction of the device-specific configuration; and generating the predicted device-specific configuration of the given application using the local prediction of the device-specific configuration and the global prediction of the device-specific configuration; and update the configuration of the given application using the predicted device-specific configuration.

In some embodiments, the first user device is configured by the configuration monitoring program to: monitor device activity of the first user device; identify that configuration update criteria have been satisfied based on the device activity; and update the configuration of the given application using the predicted device-specific configuration, in response to identifying that the configuration update criteria have been satisfied.

In some embodiments, the first user device is configured by the configuration monitoring program to: define the predicted device-specific configuration in response to identifying that the configuration update criteria have been satisfied.

In some embodiments, the server is configured to collect the global user data as anonymized aggregate data that omits personally identifiable information.

In some embodiments, the server is configured to: transmit a query to the plurality of user devices, where the query includes a request for aggregate local user data; receive, from the configuration monitoring program operating on each of the plurality of user devices, respective aggregate local user data generated locally by the configuration monitoring program on each user device from the local data stored on that user device; and combine the aggregate local user data received from the plurality of user devices to generate the global user data as global aggregate user data.

In some embodiments, the configuration monitoring program on each user device is configured to generate training weights for the device-specific configuration prediction model, and the aggregate local user data received from the plurality of user devices includes the training weights.

In some embodiments, the first user device is configured by the configuration monitoring program to: monitor a user feedback input corresponding to the configuration of the given application; and update the device-specific configuration prediction model using data corresponding to the user feedback input.

In some embodiments, the first user device is configured by the configuration monitoring program to: determine a local model prediction accuracy using the local prediction of the device-specific configuration and the user feedback input.

In some embodiments, the local model prediction accuracy is determined by the configuration monitoring program on a rolling average basis.

In some embodiments, generating the predicted device-specific configuration of the given application includes: determining whether the local prediction accuracy is above a predetermined performance threshold; and when the local prediction accuracy is above the predetermined performance threshold, generating the predicted device-specific configuration of the given application entirely from the local prediction and giving the global prediction no weight, otherwise generating the predicted device-specific configuration of the given application entirely from the global prediction and giving the local prediction no weight.

In some embodiments, generating the predicted device-specific configuration of the given application includes: assigning a first bias weight to the local prediction, where the first bias weight is based on the local prediction accuracy; assigning a second bias weight to the global prediction; and generating the predicted device-specific configuration by combining the local prediction and the global prediction according to the first and second bias weights, respectively.

In some embodiments, the first user device is configured by the configuration monitoring program to: determine whether the local prediction accuracy is above a predetermined performance threshold; and generate the predicted device-specific configuration using only the global prediction if the local prediction accuracy is below the predetermined performance threshold, otherwise generating the predicted device-specific configuration by combining the local prediction and the global prediction weighted according to the first and second bias weights respectively.

In some embodiments, the global data includes a plurality of default data outcomes.

In some embodiments, the configuration monitoring program automatically updates the configuration of the given application using the predicted device-specific configuration.

It will be appreciated by a person skilled in the art that a system or method disclosed herein may embody any one or more of the features contained herein and that the features may be used in any particular combination or sub-combination.

These and other aspects and features of various embodiments will be described in greater detail below.

BRIEF DESCRIPTION OF THE DRAWINGS

For a better understanding of the described embodiments and to show more clearly how they may be carried into effect, reference will now be made, by way of example, to the accompanying drawings in which.

Figure 1:
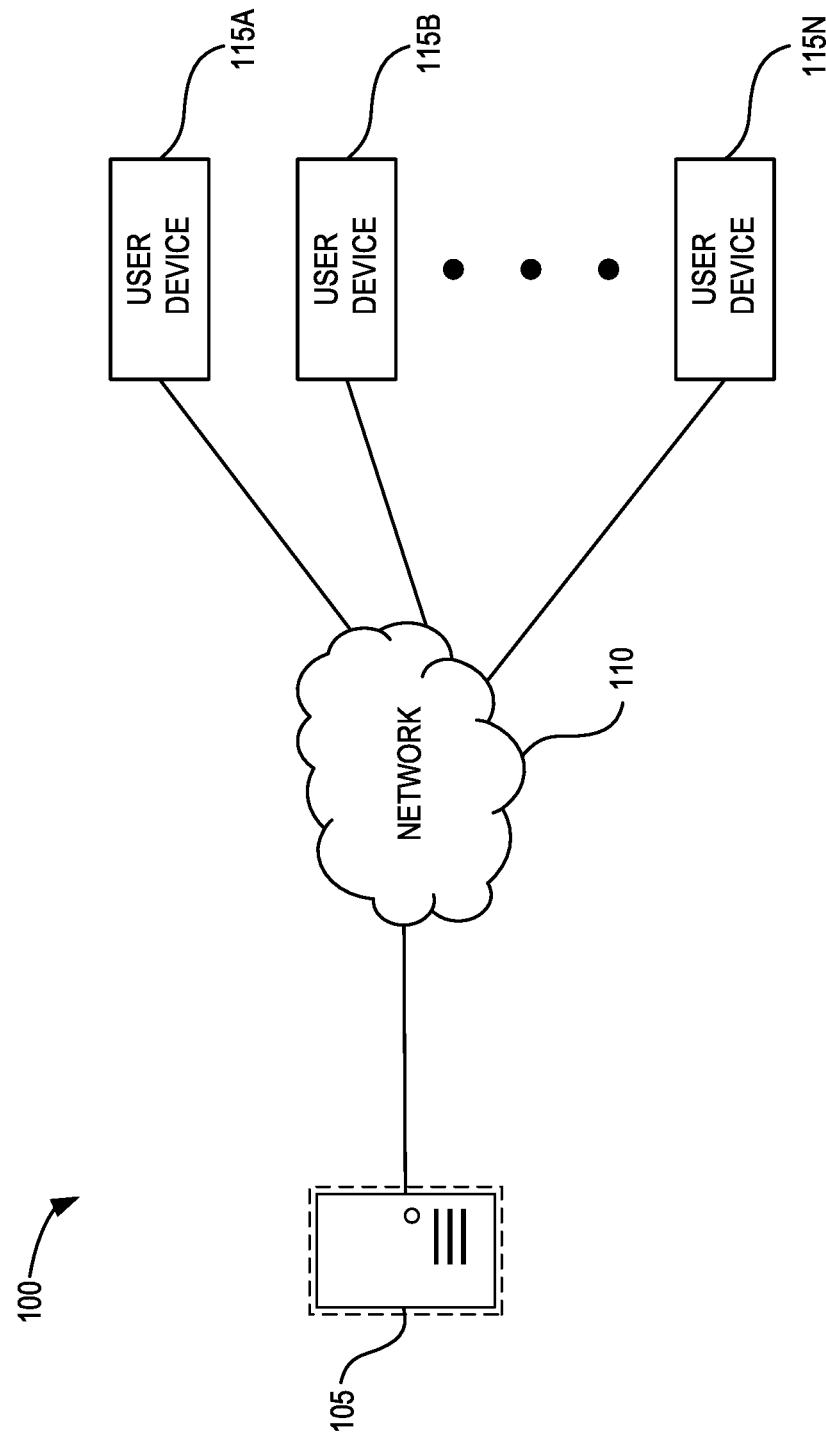
FIG. 1 is a block diagram of a computer network system in accordance with an example embodiment.

The drawings, described below, are provided for purposes of illustration, and not of limitation, of the aspects and features of various examples of embodiments described herein. For simplicity and clarity of illustration, elements shown in the drawings have not necessarily been drawn to scale. The dimensions of some of the elements may be exaggerated relative to other elements for clarity.

DESCRIPTION OF EXEMPLARY EMBODIMENTS

Various systems or methods will be described below to provide an example of an embodiment of the claimed subject matter. No embodiment described below limits any claimed subject matter and any claimed subject matter may cover methods or systems that differ from those described below. The claimed subject matter is not limited to systems or methods having all of the features of any one system or method described below or to features common to multiple or all of the apparatuses or methods described below. It is possible that a system or method described below is not an embodiment that is recited in any claimed subject matter. Any subject matter disclosed in a system or method described below that is not claimed in this document may be the subject matter of another protective instrument, for example, a continuing patent application, and the applicants, inventors or owners do not intend to abandon, disclaim or dedicate to the public any such subject matter by its disclosure in this document.

Furthermore, it will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

It should also be noted that the terms "coupled" or "coupling" as used herein can have several different meanings depending in the context in which these terms are used. For example, the terms coupled or coupling may be used to indicate that an element or device can electrically, optically, or wirelessly send data to another element or device as well as receive data from another element or device. As used herein, two or more components are said to be "coupled", or "connected" where the parts are joined or operate together either directly or indirectly (i.e., through one or more intermediate components), so long as a link occurs. As used herein and in the claims, two or more parts are said to be "directly coupled", or "directly connected", where the parts are joined or operate together without intervening intermediate components.

It should be noted that terms of degree such as "substantially", "about" and "approximately" as used herein mean a reasonable amount of deviation of the modified term such that the end result is not significantly changed. These terms of degree may also be construed as including a deviation of the modified term if this deviation would not negate the meaning of the term it modifies.

Furthermore, any recitation of numerical ranges by endpoints herein includes all numbers and fractions subsumed within that range (e.g. 1 to 5 includes 1, 1.5, 2, 2.75, 3, 3.90, 4, and 5). It is also to be understood that all numbers and fractions thereof are presumed to be modified by the term "about" which means a variation of up to a certain amount of the number to which reference is being made if the end result is not significantly changed.

The example embodiments of the systems and methods described herein may be implemented as a combination of hardware or software. In some cases, the example embodiments described herein may be implemented, at least in part, by using one or more computer programs, executing on one or more programmable devices comprising at least one processing element, and a data storage element (including volatile memory, non-volatile memory, storage elements, or any combination thereof). These devices may also have at least one input device (e.g. a pushbutton keyboard, mouse, a touchscreen, and the like), and at least one output device (e.g. a display screen, a printer, a wireless radio, and the like) depending on the nature of the device.

It should also be noted that there may be some elements that are used to implement at least part of one of the embodiments described herein that may be implemented via software that is written in a high-level computer programming language such as object oriented programming or script-based programming. Accordingly, the program code may be written in Java, Swift/Objective-C, C, C++, Javascript, Python, SQL or any other suitable programming language and may comprise modules or classes, as is known to those skilled in object oriented programming. Alternatively, or in addition thereto, some of these elements implemented via software may be written in assembly language, machine language or firmware as needed. In either case, the language may be a compiled or interpreted language.

At least some of these software programs may be stored on a storage media (e.g. a computer readable medium such as, but not limited to, ROM, magnetic disk, optical disc) or a device that is readable by a general or special purpose programmable device. The software program code, when read by the programmable device, configures the programmable device to operate in a new, specific and predefined manner in order to perform at least one of the methods described herein.

Furthermore, at least some of the programs associated with the systems and methods of the embodiments described herein may be capable of being distributed in a computer program product comprising a computer readable medium that bears computer usable instructions for one or more processors. The medium may be provided in various forms, including non-transitory forms such as, but not limited to, one or more diskettes, compact disks, tapes, chips, and magnetic and electronic storage. The computer program product may also be distributed in an over-the-air or wireless manner, using a wireless data connection.

The term "software application" or "application" refers to computer-executable instructions, particularly computer-executable instructions stored in a non-transitory medium, such as a non-volatile memory, and executed by a computer processor. The computer processor, when executing the instructions, may receive inputs and transmit outputs to any of a variety of input or output devices to which it is coupled. Software applications may include mobile applications or "apps" for use on mobile devices such as smartphones and tablets or other "smart" devices.

A software application can be, for example, a monolithic software application, built in-house by the organization and possibly running on custom hardware; a set of interconnected modular subsystems running on similar or diverse hardware; a software-as-a-service application operated remotely by a third party; third party software running on outsourced infrastructure, etc. In some cases, a software application also may be less formal, or constructed in ad hoc fashion, such as a programmable spreadsheet document that has been modified to perform computations for the organization's needs.

Software applications may be deployed to and installed on a computing device on which it is to operate. Depending on the nature of the operating system and/or platform of the computing device, an application may be deployed directly to the computing device, and/or the application may be downloaded from an application marketplace. For example, user of the user device may download the application through an app store such as the Apple App Store™ or Google™ Play™.

A software application may have a plurality of different configurations that may be used for the application user interface. The different configurations may be designed to encourage user engagement with the application and/or to facilitate user interactions. Different configurations may include variations of user interface elements and user interface parameters that may facilitate user interactions by different users. Modifying the configuration of a software application to be more tailored to individual users can increase user engagement and facilitate user interactions with a software application.

Tailoring application configurations may encourage a user to make additional use of the software application as this may provide the user with an easier and more enjoyable experience using the application. However, determining the application configuration that is suited to an individual user is often difficult. Monitoring application use data and performing analytics on that data can provide insights into a user's preferred application configuration. However, the analysis of this user interaction data is often performed remotely from the user's device, for instance on a remote server. Providing the server with individual interaction data may be problematic or risky, as this interaction data often includes personally identifiable and/or private data. This may result in the server being a target for hacking operations and may significantly increase the potential liability for the administrator of the server in storing this data. As a result, the administrator may be forced to implement significant and possibly expensive data protection systems and policies while still running the risk of a data breach.

In some cases, analyzing an individual user's interactions with an application may provide insufficient data to evaluate configurations that are likely to be preferred by the user.

Particularly where the user has just begun using the application, or use of the application is minimal or inconsistent, it may be difficult to acquire sufficient data to determine accurately from that user's own interactions what application configurations are likely to lead to increased user engagement. In such cases, it may be desirable to use data from other users of the application to provide a larger data set of user interactions that allow for improved analysis of preferred application configurations.

Embodiments described herein provide systems and methods for automatically determining an expected preferred configuration of a software application operating on a computing device. The embodiments described herein may determine a device-specific configuration for the software application operating on a user device. The device-specific configuration may be determined as the configuration of user interface elements of the software application that is likely to be preferred on that user device (e.g. by the user or users of that device).

A configuration monitoring program can operate on a user's device as part of, or in addition to, the software application operating on the user device. The configuration monitoring program can be configured to determine the device-specific configuration for the software application.

The configuration monitoring program can include both a device-specific configuration prediction model and a global configuration prediction model. The device-specific configuration prediction model and the global configuration prediction model can operate contemporaneously on the user device (i.e. within the configuration monitoring program). Each of the device-specific configuration prediction model and the global configuration prediction model can generate separate, and independent, predictions for the preferred configuration of the software application. The configuration monitoring program can then determine a predicted device-specific configuration using the predictions from the device-specific configuration prediction model and the global configuration prediction model.

In some cases, the local and global predictions may be combined in some manner to define the predicted device-specific configuration. In other cases, the configuration monitoring program may apply one or more prediction criteria to determine which of the local and global predictions should be selected as the predicted device-specific configuration.

The device-specific configuration prediction model can be defined using local user data from the device on which the configuration monitoring program operates. The device-specific prediction model can thus be trained locally on the user device. The configuration monitoring program can generate, and modify, the device-specific configuration prediction model using a machine learning algorithm that operates on the user device using the local data. The device-specific prediction model may be trained locally on the device using local interaction data from the user device. This may reduce concerns regarding data sensitivity that might arise if the user data is transmitted off the user device.

In some cases, the configuration monitoring program can define the device-specific configuration prediction model as a purely local model. That is, the device-specific configuration prediction model may not be modified (e.g. mixed or retrained) using data from other devices or from the global configuration prediction model. This may ensure that the predictions generated by device-specific configuration prediction model are targeted specifically to that device (and in turn the user(s) of that device).

The global prediction model can be generated remotely at a central server. The global prediction model can be trained using user data from a plurality of different users and different devices. In some cases, the global prediction model may be trained using aggregate user data compiled from a plurality of user devices. In embodiments described herein, the aggregate user data may be collected from the user devices while omitting any personally identifiable information.

The configuration monitoring program may be configured to predict or estimate the configuration of the software application at defined intervals and/or in response to device activity (e.g. user interactions and/or a change in the device environment or location). The configuration monitoring program may then use the local and global prediction models to determine a predicted configuration. The device-specific prediction model can generate a local prediction and the global model can generate a global prediction for the configuration of the software application. The configuration monitoring program can then determine the predicted device-specific configuration or variant using the local prediction and the global prediction. In some cases, the configuration monitoring program may apply prediction weights to both local and global predictions to determine a predicted device-specific variant of the application configuration.

In some cases, the configuration monitoring program may be configured to automatically implement the predicted device-specific configuration in the software application operating on the user device. In other cases, the configuration monitoring program may provide the predicted device-specific configuration as a selectable option for the user, for instance through a prompt on the user device. The user may then select whether to implement the predicted device-specific configuration or another configuration for the application.

Additionally or alternatively, the configuration monitoring program may use the predicted device-specific configuration to evaluate the success/accuracy of the local and/or global prediction models. For example, the configuration monitoring program may monitor user input to the device, including user feedback data. The feedback data may be generated based on user actions such as accepting or using the prediction device-specific variant, or manually modifying the application configuration. The feedback data may also include various user engagement and user interaction data related to user of the application. The accuracy of the device-specific prediction model can then be assessed using the feedback data. The configuration monitoring program may then update or modify the device-specific prediction model based on model accuracy. As the device is used, both local and global models can be continually retrained using both local and aggregate data, respectively.

As used herein, the configuration of a software application generally refers to any configurable variant of a software application that contributes to the user experience offered by that application. By way of non-limiting examples, a configuration variant may relate to aspects of the application user interface, such as the visual configuration of the user interface (e.g. layout or format), the configuration of audible or tactile outputs from the application, and in some cases deployment of, or access to, specific application features. It will be appreciated that different applications will include different configuration parameters, and in particular, these configuration may dynamically change in response to changes in device activity, user-device interaction, and changes in user device attributes.

For example, the configuration monitoring program may monitor the configuration of various parameters of user interface elements of the application as well as the relationship between the user interface elements within the application user interface. Examples of user interface element parameters that may be modified can include color, user interaction responses, element position (e.g., X and Y coordinates) within the application user interface, element arrangement within the foreground and/or background of the user interface, textual content, justification of the text, font, font size. Various examples of application parameters such as user interface element parameters that may be modified by the configuration monitoring program, and how those modifications may be implemented, are described in further detail in Applicant's U.S. Pat. No. 9,507,609B2 the entirety of which is incorporated herein by reference.

As one example, the configuration monitoring program may be configured to monitor a messaging application operating on a user device (e.g. an application for e-mail, text, or Short Messaging Service (SMS)). The configuration of the messaging application that is being monitored may include the visual layout of the application and how specific content elements are arranged within that layout. For instance, messages can be displayed in a particular manner (e.g. in line or in bubbles), or otherwise sorted or classified in a particular manner (e.g. a color-coded classification scheme). As another example, the way in which certain user interface elements are displayed (e.g. the text chosen for specific buttons, or the color chosen for certain buttons) may be modified.

As another example, the configuration monitoring program may be configured to monitor a media-playback application. The media-playback application may be configured to define how the user interface elements of available audio or video files are arranged within the user interface of the application. In some cases, the configuration monitoring program may arrange the user interface elements in one of a number of pre-defined layout configurations.

As a further example, the configuration monitoring program may be configured to monitor an ordering or shopping application. The configuration monitoring program may configure various user interface elements within the application to define how those user interfaces elements are displayed. In some cases, the configuration monitoring program may select the text that may appear on interactive user interface elements (e.g. selecting whether an interactive element includes the text 'cart' and 'basket', or whether a different interactive element includes the text 'order', 'buy', or 'purchase').

A "device-specific" configuration refers to a preferred or desired configuration for a software application operating on a user-device that is specific to that user device. In general, the device-specific configuration refers to the configuration of the software application being determined or selected specifically for the device in question, whether or not it is different from the configuration on any other given device. The device-specific configuration may not be a static, unchanging, configuration but may vary over time based on manually selected configurations and even changes in the available configurations for the software application (e.g. if the user interface for the application is updated). The device-specific configuration for a software application on a given user device may change dynamically in response to monitored activity on the device, such as user interactions and inputs, as well as changes to the device characteristics (e.g. updating the operating system) and device environment.

In embodiments described herein, the configuration monitoring program may use one or more machine learning algorithms in order to automatically determine, or predict, the device-specific configuration for a software application operating on a user device. Various types of machine learning algorithms may be used to generate the prediction models that, in turn, are used to generate the local and global configuration predictions. For instance, the machine learning algorithms may be configured to perform supervised learning processes in order to determine the predicted configuration models.

Generally, during "supervised learning" processes, a machine learning algorithm can be provided with a set of "training data" which is composed from a set of example input data, and set of example resultant output data. The machine learning algorithm can iterate over the "training data" with a view to mapping (or correlating) the input data to the desired output data. Once the mapping is complete, each input variable can be assigned a "model weight" based on how strongly that input variable is connected (or correlated) to the resultant output data. The mapping can then generate a "predictive model" which may be used to predict, or extrapolate, new output data results using new input data.

In embodiments described herein, the output variables for machine learning algorithms used by the configuration monitoring program can be defined as the preferred configurations for a given software application. The input features (or input variables) may be defined as the classes of data (or types of data) determined to be connected to a user's selection of a particular configuration (e.g., weather, user activity, time of day etc.). The input variables and the output variables will accordingly vary depending on the particular software application at issue, as well as the available "training data". In some cases, the input features for a given software application may be defined by a developer of the application, and may even be modified after the application has been deployed.

Any suitable machine learning algorithm configured for supervised learning and/or reinforcement learning may be used for determining the device-specific configuration of an application. For example, in various embodiments, the machine learning algorithms may be classification or regression algorithms. Examples of classification and regression algorithms include neural networks, deep learning neutral networks, support vector machines (SVM), decision trees, random forests, k-nearest neighbor algorithms (KNN), logistic regression algorithms, and naïve Bayes algorithms among others.

In accordance with the some embodiments provided herein, the global prediction model and local prediction model can be generated using separate processes. In some cases, the global prediction model and local prediction model may be generated using two separate machine learning algorithms. The configuration monitoring program may include a first machine learning algorithm operable to generate the local prediction model for the configuration of the software application. A global configuration program that may be provided on a server can be used to generate the global prediction model. The global configuration program may include a second machine learning algorithm that can be configured to generate a global prediction model for the software application configuration.

The first machine learning algorithm (also referred to herein as a "local machine learning algorithm") can operate (or be hosted) on the user device and can be trained using local data available on the user device. In at least some embodiments, the local user data can include both public data and private data (i.e., data that includes personally identifiable information (PII) in respect of particular users). The local machine learning algorithm can iterate over the local user data in order to generate a device-specific configuration prediction model (also referred to herein as a "local prediction model", or simply, a "local model"). The device-specific configuration prediction model can be used by configuration monitoring program on the user device to produce local predictions of a device-specific configuration for a given software application operating on the user device. In some embodiments, the local prediction model may remain stored solely on the user device and may not transmitted be from the user device to any third-party devices (i.e., a remote server). This may avoid disclosing individual user preferences on an identifiable basis.

The second machine learning algorithm (also referred to herein as a "global machine learning algorithm") can operate (or be hosted) on a remote server. The global machine learning algorithm may be trained using an aggregated data that includes anonymized aggregate data received from one or more user devices. As explained herein, the aggregate data may include cumulative data that does not otherwise include personal or private information about particular users. The global machine learning algorithm can iterate over the aggregate data to generate a global configuration prediction model (also referred to herein as a "global prediction model", or simply, a "global model"). The global prediction model can be distributed to the user devices. The global prediction model can be used by the configuration monitoring program on each of the user devices to generate "generalized" global predictions of device-specific configurations for given software applications. The user devices may then use the predictions from the local and global models to generate a predicted device-specific configuration for the software application.

In some embodiments described herein, the global prediction model may be generated based on data from local prediction models on a plurality of user devices, rather than using machine learning algorithm stored on the server. For example, in some cases, the server may be configured to receive "training weights" generating by partially-trained local prediction models hosted on the one or more user devices. The "training weights" can be combined on the remote server to generate the global prediction model. The global prediction model may then distributed to the one or more user devices for use in generating a global prediction of a device-specific configuration for an application. In still other cases, the global prediction model can be defined to include a set of pre-defined baseline or default configuration options for a particular software application.

Referring now to FIG. 1, there is shown a block diagram of a computer network system 100 in accordance with an example embodiment. As shown, the computer network system 100 generally includes a server 105, a network 110 and one or more user devices 115A-115N connected via network 110.

In at least some embodiments, network 110 may be connected to the internet. Typically, the connection between network 110 and the Internet may be made via a firewall server (not shown). In some cases, there may be multiple links or firewalls, or both, between network 110 and the Internet. Some organizations may operate multiple networks 110 or virtual networks 110, which can be internetworked or isolated. These have been omitted for ease of illustration, however it will be understood that the teachings herein can be applied to such systems. Network 110 may be constructed from one or more computer network technologies, such as IEEE 802.3 (Ethernet), IEEE 802.11 and similar technologies.

Server 105 is a computer server that is connected to network 110. Server 105 has a processor, volatile and non-volatile memory, at least one network interface, and may have various other input/output devices. As with all devices shown in the system 100, there may be multiple servers 105, although not all are shown.

User devices 115 generally refer to desktop or laptop computers, but may also refer to smartphones, tablet computers, as well as a wide variety of "smart" devices capable of data communication. Like server 105, user devices 115 each include a processor, a volatile and non-volatile memory, at least one network interface, and input/output devices. User devices 115 may be portable, and may at times be connected to network 110 or a portion thereof.

As will be understood, a user device 115 may be any suitable computing device 115 capable of executing an application. For example, in various embodiments, the computing device 115 may include mobile devices such as smartphones, tablets or laptops, as well as less conventional computing devices such as: smart appliances (e.g., computers embedded within refrigerators, thermostats, stoves, microwaves, televisions); wearable computing devices such as smartwatches, smart glasses, and/or smart clothing; computers embedded into automobiles, cars or vehicles (e.g., as may have been provided for navigation and/or entertainment purposes). Further examples of computing devices 115 include digital media receivers, programmable billboards, advertising displays, and/or medical diagnostic equipment.

Each of the user devices 115 can have a plurality of software applications operating thereon. The user devices 115 can also include a configuration monitoring program associated with one or more of those software applications. In some embodiments, the configuration monitoring program may be integrated with a given software application. Alternatively, the configuration monitoring program may be separate application operating on the user device 115. The configuration monitoring program may be configured to monitor the configuration of the given application on the user device 115 and to generate device-specific predictions for the configuration of the application that would be preferred on that user device 115.

The configuration monitoring program can use a local prediction model and a global prediction model to determine the predicted configuration for the application on that user device 115. The local prediction model may be defined and trained using local data from the user device 115. The global prediction model may be provided by the server 105. The server 105, in turn, may generate the global prediction model using data from a plurality of user devices 115.

In embodiments of the system 100, the server 105 can be configured to communicate with the user devices 115. The server 105 may request device data from the user devices 115 relating to user interactions on those devices 115. The server 105 may generate requests for aggregated data from each of the devices 115, rather than any individually identifiable data. The user devices 115 may transmit to the server 105 corresponding data in an aggregated form, to avoid the transmitted data being individually or personally identifiable.

The server 105 can generate and train the global prediction model using the data received from the plurality of user devices. The server 105 can also provide each of the user devices 115 with the global prediction model, as well as any subsequent updates to the global prediction model that may be generated.

Figure 2:
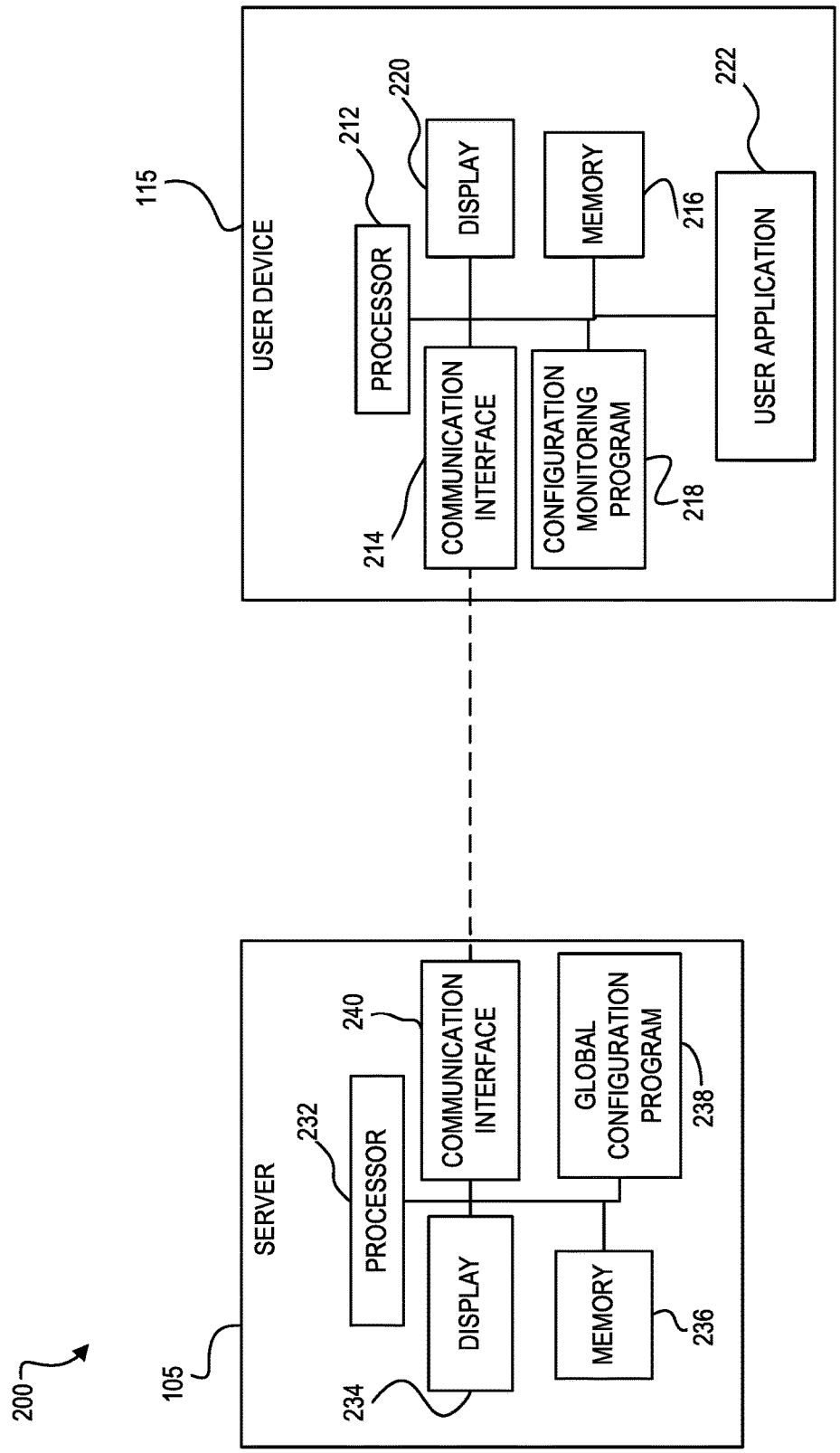
FIG. 2 is a block diagram of a system for automatically determining a device-specific configuration for a software application in accordance with an example embodiment.

Referring now to FIG. 2, there is shown a block diagram of a system 200 for automatically determining a device-specific configuration for a given application operating on a user device, in accordance with an example embodiment. System 200 illustrates a more detailed example of components of the server 105 and a user device 115.

As shown in FIG. 1 server 105 is a computer server that is connected to network 110. As shown in FIG. 2, server 105 can include a processor 232, a display 234, a memory 236, a communication interface 240 and a global configuration program 238. Although shown as separate elements, it will be understood that the global configuration program 238 may be stored in memory 236.

It will be understood that the server 105 need not be a dedicated physical computer for executing the global configuration program 238. For example, in various embodiments, the various logical components that are shown as being provided on server 105 may be hosted by a third party "cloud" hosting service such as Amazon™ Web Services™ Elastic Compute Cloud (Amazon EC2).

Processor 232 is a computer processor, such as a general purpose microprocessor. In some other cases, processor 232 may be a field programmable gate array, application specific integrated circuit, microcontroller, or other suitable computer processor.

Processor 232 is also coupled to display 234, which is a suitable display for outputting information and data as needed by various computer programs. In particular, display 234 may display a graphical user interface (GUI). In some cases, the display 234 may be omitted from server 105, for instance where the server 105 is configured to operate autonomously.

Communication interface 240 is one or more data network interface, such as an IEEE 802.3 or IEEE 802.11 interface, for communication over a network.

Processor 232 is coupled, via a computer data bus, to memory 236. Memory 236 may include both volatile and non-volatile memory. Non-volatile memory stores computer programs consisting of computer-executable instructions, which may be loaded into volatile memory for execution by processor 232 as needed. It will be understood by those of skill in the art that references herein to server 105 as carrying out a function or acting in a particular way imply that processor 232 is executing instructions (e.g., a software program) stored in memory 236 and possibly transmitting or receiving inputs and outputs via one or more interface. Memory 236 may also store data input to, or output from, processor 232 in the course of executing the computer-executable instructions. As noted above, memory 236 may also store the global configuration program 238.

User device 115 is generally a mobile computer such as a smartphone or tablet or other "smart" device that may be networked through the "Internet of Things". However, user devices 115 may also be a non-mobile computer device, such as desktop computer. As shown, user device 115 has a processor 212, a communication interface 214 for data communication with communication interfaces 240 and 254, a display 220 for displaying a GUI, and a memory 216 that may include both volatile and non-volatile elements. As with server 105, references to acts or functions by mobile device 115 imply that processor 212 is executing computer-executable instructions (e.g., a software program) stored in memory 216.

The user device 115 also includes a configuration monitoring program 218. While the configuration monitoring program 218 is shown separately from memory 216, it will be understood that the configuration monitoring program 218 may be stored in memory 216. The user device 115 may also store a plurality of other software applications, such as a user application 222, in memory 216. The device memory 216 may generally store instructions which, when executed by the device processor 212 causes, the device processor 212 to provide functionality of the various applications stored thereon.

In various embodiments, the configuration monitoring program 218 may be a standalone program (or software application) that is downloaded and installed on the user device 115. In other embodiments, the configuration monitoring program 218 may be integrated into a third-party software application, which itself, is downloaded and installed on the user device 115 (e.g., through an app store such as the Apple App Store or Google Play).

An application developer may use a software development kit (SDK) associated with the present system 200 when writing source code for the user application 222. The SDK may include programming language units (e.g., class definitions, library functions, etc.) that are usable by a software developer to create user interface elements within the application 222 that may be able to communicate with the configuration monitoring program 218 and/or logical elements on the server 105. In some cases, a developer may use the SDK when developing or modifying the software application 222 to integrate the configuration monitoring program 218 into a new application or into an existing application.

In various embodiments, the application 222 on the computing device 115 may include executable code corresponding to the programming language unit for a user interface element. Configuration parameters for this user interface element may be received by this executable code. This may allow the user interface elements to be updated and/or modified without requiring a re-compilation of the application code. The user interface elements may correspond to compiled code from UI element classes provided in the SDK, with this compiled code configuring the computing device 115 to receive the parameters. In some cases, the configuration monitoring program 218 may be configured to define and/or modify the configuration of application 222 by defining interface element parameters corresponding to user interface elements defined in that application 222.

As explained in further detail herein, the configuration monitoring program 218 may be configured to host a local machine learning algorithm. The local machine learning algorithm may be configured to use local user data to generate a local prediction model of the device-specific configuration of a software application.

The configuration monitoring program 218 can also be configured to receive a global prediction model generated by the global configuration program 238 on server 105. The configuration monitoring program 218 may then the local and global prediction models to generate a predicted device-specific configuration for software application 222 operating on user device 115.

In some embodiments, the configuration monitoring program 218 may also be configured to receive queries for aggregate data from the global configuration program 238. In response to these queries, the configuration monitoring program 218 may collect the request data on an aggregate basis. The configuration monitoring program 218 can then transmit the requested aggregated data back to the global configuration program 238.

The server 105 may store device interaction data such as application use data received from the user devices 115. The device interaction data may be stored in a database on memory 236. The device interaction data may reflect interactions with a given application on the user devices 115. The device interaction data may be stored on the server 105 in an aggregate form. That is, the device interaction data may not provide any identifiable data corresponding to a specific user device. This anonymized aggregate data may be received from the configuration monitoring program 218 in response to a request from the global configuration program 238.

The device interaction data may be received from each of the user devices 115 as aggregated device data. In response to a request from the server 105, the configuration monitoring program 218 on user device 115 may generate aggregate device data based on the local user data stored in the memory of user device 115. The aggregate device data may reflect aggregate user interactions with the user device 115. This may prevent the user interaction data from providing personally identifiable information regarding a user of the user device 115.

In some embodiments, the global configuration program 238 may define and store a global machine learning algorithm. The global machine learning algorithm may be used to generate a global configuration prediction model for a given software application, such as user application 222. This global configuration prediction model can then be provided to user device 115, for use by configuration monitoring program 218. The global machine learning algorithm may use data stored on the server 105 as "training data" in order to generate the global configuration prediction model.

In some cases, the global configuration prediction model may be generated by combining local prediction model "training weights" received from the one or more user devices 115. The global configuration prediction model may then be distributed by the global configuration program 238 to the user devices 115. The user devices 115 can then use the global configuration prediction model to generate generalized predictions of a device-specific configuration of a particular software application. In at least some embodiments described herein, the global configuration program 238 may also be configured to distribute a default configuration prediction model which generates default configuration predictions for a given software application.

In addition to the components described above, the server 105 and the user device 115 may have various other additional components not shown in FIG. 2. For example, additional input or output devices (e.g., keyboard, pointing device, etc.) may be included beyond those shown in FIG. 2.

Figure 3A:
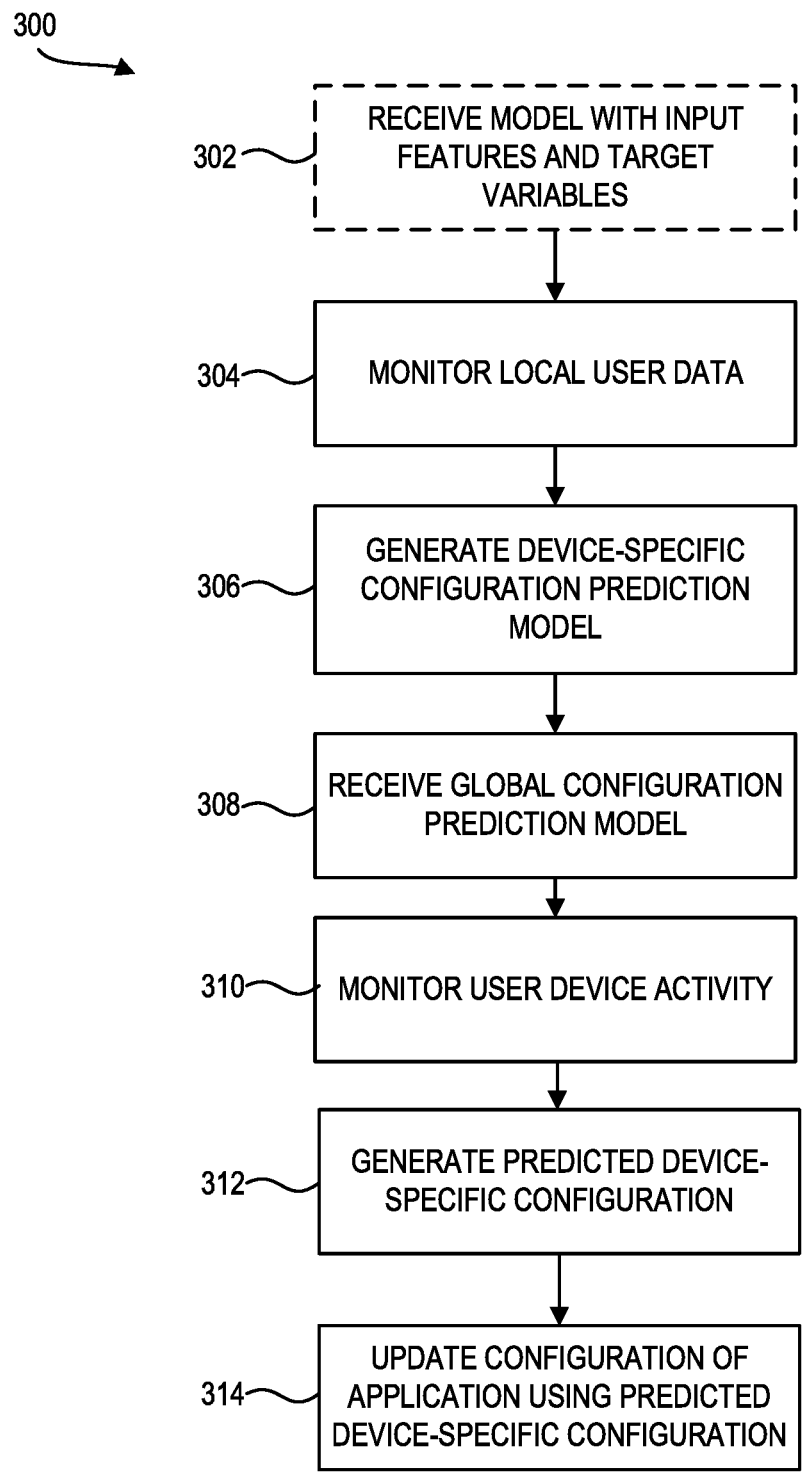
FIG. 3A is a flowchart illustrating a method for automatically determining a device-specific configuration for a software application in accordance with an example embodiment.

Referring now to FIG. 3A, there is shown a flowchart illustrating a method 300 for automatically determining a device-specific configuration for an application operating on a user device 115, in accordance with an example embodiment. The method 300 may be carried out by various components of the systems 100 and 220, such as the configuration monitoring program 218 operating on a user device 115.

Optionally, at 302, the configuration monitoring program 218 may receive, from the server 105, a prediction model format for a local configuration prediction model. The prediction model format may identify input features and target variables for a local configuration prediction model to be generated by the configuration monitoring program 218.

For example, the prediction model format may be a dataset schema that specifies the input variables (i.e. input data features) and output variables for a local machine learning algorithm defined in the configuration monitoring program 218. The dataset schema may specify that the output variable(s) is/are a configuration for a given application operating on the user device 115. The dataset schema may further specify the input features as specific variables that may or may not be determinative of that configuration (e.g., weather, user's activity, user's location, etc.). In general, the prediction model can map the input data to the output variable(s). This mapping can determined through a machine learning process where the mapping is learned (at least initially) using historical user data and/or live using real-time data and feedback.

In some embodiments, an administrator (e.g. a server administrator and/or an application developer) may independently define the dataset schema. For example, the administrator user may use the display 234 on the server 105 to define a model with input features and output variables. The administrator may also specify the dataset schema using an administrator computer connected to the server 105. This model may then be distributed by the server 105 to the user devices 115 in the form of a dataset schema. In other embodiments, the dataset schema may be automatically generated by the global configuration program 238 and distributed to the user devices 115. In still other embodiments, the configuration monitoring program 218 may be pre-configured with a dataset schema.

At 304, the configuration monitoring program 218 can monitor local device data on the user device 216. The local device data may be stored in memory 216. The configuration monitoring program 218 can be configured to monitor the local device data stored in memory 216 on a continual or ongoing basis. The configuration monitoring program 218 can use the monitored local data to train the local machine learning algorithm hosted by the configuration monitoring program 218.

The local data stored in memory 216 can include user interaction data generated based on user interactions with the user device 115. For example, the user interaction data may include user-specified configuration data generated when a user manually sets or modifies the configuration of an application, such as user application 222, operating on the user device 115.

The local data stored in memory 216 can also include device attribute data. The device attribute data may include data indicating the status and settings of the user device 115, such as the device type, active operating system (which may include operating system version data), battery charge status, connectivity status (e.g. Wi-Fi connectivity status, Telecommunications network connectivity status, Bluetooth connectivity status, wired connectivity status), and other settings relating to the operation of the user device 115 generally.

The local data stored in memory 216 can also include application attribute data. The application attribute data may include data indicating the status and settings of individual applications such as user application 222 operating on user device 115, such as the application identifier, application version, application permissions, and other settings relating to the operation of individual applications on the user device 115.

The local data stored in memory 216 can also include device environment data. The device environment data may include data relating to the environment in which the device 115 is present, such as the location, date, time, weather and so forth.

As should be apparent, the local data stored in memory 216 can include data that may be considered private to a user of the device 115. A user may wish to protect this data, and prevent unauthorized access to that data. This private data can include both personally identifiable information (PII) which identifies users of the user device 115, as well as information about discrete user events (e.g., item purchase history, click event history, time-stamped events, etc.). The local data stored in memory 216 may also include data relating to the devices or applications (e.g. application identifiers, versions and so forth) that may be unrelated to the user's personally identifiable information.

In some cases, the configuration monitoring program 218 operating on the user device 115 can be configured to monitor any and all of the local data stored in memory 218. In some cases, the data to be monitored by configuration monitoring program 218 may be limited by the permissions granted to the configuration monitoring program 218 (or the application with which it is integrated). Nonetheless, the configuration monitoring program 218 can be configured to monitor and evaluate private user data stored locally on user device 115.

In some embodiments, the scope of local user data monitored by configuration monitoring program 218 may be limited to specific classes of data defined by the dataset schema received at 302. The configuration monitoring program 218 may thus monitor only data that is relevant to the input and output variables specified by the dataset schema that is being used to generate a prediction model. This may ensure that the local prediction model is generated using only data likely to be relevant to predicting the device-specific configuration.

At 306, the configuration monitoring program 218 can use the monitored local user data to generate a device-specific configuration prediction model (also referred to herein as a "local prediction model", or a "local model").

The local prediction model can be generated by iteratively training a local machine learning algorithm over the local user data monitored at 304. In some embodiments, the local machine learning algorithm can be iteratively trained over only the classes of data specified by the dataset schema in 302 (i.e. only data which relates to the input and output variables specified by the dataset schema).

Once the training is complete, the local machine learning algorithm can generate a local prediction model. The local prediction model can be used to predict a device-specific configuration of a given software application. In particular, the local prediction model may be adapted to use local user data to predict the configuration that would be desired by a user of that particular user device 115.

In some embodiments, once the local prediction model is generated, the model can be stored exclusively on the user device 115. The local prediction model may not be transmitted or distributed to other third-party devices (i.e., server 105 or other user device 115). This may ensure that private and sensitive local user data, which is used to generate the local prediction model, is not compromised.

At 308, the configuration monitoring program 218 can receive a global configuration prediction model from the server 105. The global configuration prediction model may also be referred to herein as a "global prediction model", or a "global model". The global prediction model can be generated by the global configuration program 238 on server 105.

In some embodiments, the global configuration program 238 may generate the global prediction model using a global machine learning algorithm. In contrast to the local machine learning algorithm, the global machine learning algorithm is not trained using local user data. Rather, the global machine learning algorithm can be trained using data from a plurality of user devices 115. The data from the user devices 115 may be combined into an aggregate data source that may be stored, for example, on memory 236 of server 105. An example process for generating aggregate device data is explained further detail herein with reference to FIG. 5.

In some cases, the aggregate data may be defined by the configuration monitoring program 218 on the user devices 115 to exclude sensitive or personally identifiably information (PII) specific to users of user device 115. For example, the configuration monitoring program 218 may generate aggregate device data on an anonymous based by excluding discrete event data generated through monitored device activity (i.e. data associated with individual user interactions and related settings and/or environmental data).

In other cases, the aggregate data can be defined to include only cumulative statistical data (e.g. "total counts", or "probabilities") regarding device interactions. For example, the data may restricted to the number of user interactions at a given time (e.g. evening) over the course of a longer time period. Additionally or alternatively user data may be restricted to include only the probabilities of certain events occurring (e.g. the likelihood of a user accessing a given interface within the application when the weather is sunny).

The input features for the global machine learning algorithm may differ from the input features for the local machine learning algorithm. In particular, global machine learning algorithm may be modified to accommodate the more generalized nature of data used by the global machine learning algorithm.

In some cases, the local model may be defined to use variables not available to the global model, for instance variables based on data that is not available to the global model e.g. due to privacy concerns. In some cases, the global mode and local model may be defined using the same variables while the values of some variables differ between the models due to aggregation and collection from all devices.

In other embodiments, the global prediction model may not be generated by training a global machine learning algorithm. For example, in at least some embodiments, the global configuration program 238 can receive, from the configuration monitoring program 218 on a plurality of user devices 115, "training weights" generated from partially trained local prediction models. The "training weights" can be generated after a pre-defined number of training iterations of the local machine learning algorithm on the local user data. In some cases, the "training weights" can be generated once the local machine learning algorithm satisfies one or more training criteria, such as various machine leaning metrics (e.g. accuracy, precision, recall etc.). The "training weights", similar to "model weights", may provide a preliminary prediction of the extent to which the input variables, of the local machine learning algorithm, are connected to the target output variables (i.e., a specific application configuration). The global configuration program 238 can receive these "training weights" and merge the weights from the plurality of user devices 115 to generate the global prediction model. As the training weights do not include personal or sensitive data, user data privacy can still be preserved when the training weights are provided to server 105.

Where the global configuration program 238 is generated by combining "training weights", the combining of "training weights" can be performed using any one of a number of suitable combination algorithms that yield high performance. For example, where the "training weights" are generated by local machine learning algorithms that use classification functions, the "training weights" can be combined using a modified softmax function. In other cases, where the "training weights" are generated by local machine learning algorithms that use regression functions, the "training weights" can be combined via a weighted combination.

In still other embodiments, the global prediction model may be defined to include a set of baseline or default device-specific configurations. The default or baseline configurations can be specified, for example, by an administrator, such as the developer of the application being monitored.

At 310, the configuration monitoring program 218 can monitor user device activity. The configuration monitoring program 218 may monitor device activity data to determine whether configuration update criteria for a given software application have been satisfied.

Configuration update criteria may be used to determine if and when a change in the configuration of an application is required. The configuration update criteria may be related to the input variables for the local and global prediction models. For instance, the update criteria for a given software application may include a change in the user's activity, a change in the weather, or a change in the user's location. To this end, the specifics of the configuration update criteria may vary depending on the application, and the corresponding design of the local and global models (i.e. the defined input and output variables for these models).

In at least some embodiments, the configuration monitoring program 218 may monitor whether the configuration update criteria is satisfied by monitoring user device activity, such as user-interactions with the user device 115 (i.e., user inputs), as well as changes to the environment of the user device or attributes of the user device (i.e., changes in the weather, or time of day).

At 312, the configuration monitoring program 218 can generate a predicted device-specific configuration for a software application operating on the user device 115. The configuration monitoring program 218 may generate the predicted device-specific configuration at a defined time or interval. This may allow the configuration monitoring program to continually evaluate the accuracy of the predicted device-specific configuration.

The configuration monitoring program 218 may also generate a predicted device-specific configuration in response to device activity being monitored at 308. For example, the configuration monitoring program 218 may determine that a configuration update criteria has been satisfied by the monitored device data. The configuration monitoring program 218 can then generate a predicted device-specific configuration in response to the criteria being satisfied.

The predicted device-specific configuration indicates a prediction or estimate of the expected configuration for the particular application on a given user device 115. The predicted device-specific configuration may reflect the configuration that is expected to be selected by a user of the application. In some cases, however, the predicted device-specific configuration may reflect a configuration that is expected to provide the user of device 115 with the greatest user engagement with the application. Examples of user engagement criteria that may be considered include click through rate on an object, a message open rate, a purchase amount, a purchase rate etc.

For example, the configuration monitoring program 218 may determine that the device 115 is being used on October 31$^{st}$. The configuration monitoring program 218 may then determine that the predicted device-specific configuration for a software application operating on the user device may include a modified interface background that includes spider webs and witches reflective of Halloween.

The predicted device-specific configuration can be generated by the configuration monitoring program 218 using the predictions from the local prediction model and the global prediction model. The manner in which the local prediction and global predictions are used, and may be weighted and/or combined, may vary in different embodiments (see the various examples shown in FIGS. 4A-4D and described further herein). However, in general the configuration monitoring program 218 always has available both the local prediction model and the global prediction model to provide a local configuration prediction and a global configuration prediction respectively for the software application being monitored.

At 314, the configuration monitoring program 218 can update the configuration of the application using the predicted device-specific configuration determined at 312.

In some cases, updating the configuration of the application may involve automatically implementing the predicted device-specific configuration in the software application. In some cases, the predicted device-specific configuration may be limited to defined environmental or other conditions (e.g. a defined time period). The predicted device-specific configuration may then be implemented only in accordance with those limited deployment criteria. For example, the Halloween background may be automatically deployed in the software application, but only beginning at 6 am on October 31$^{st}$ and ending at 5 am on November 1$^{st}$.

In cases where the configuration monitoring program 218 automatically implements a predictive device-specific configuration, a user may be able to manually revert to the previous configuration or otherwise change the configuration of the application.

In other cases, the configuration monitoring program may prompt a user to accept or decline the predicted device-specific configuration. The user may then accept the implemented configuration, decline the modification, or may select a new or different configuration for the application.

In still other cases, the configuration monitoring program 218 may merely record the predicted device-specific configuration. The configuration monitoring program 218 may then use this predicted device-specific configuration to evaluate the accuracy of the combined prediction model being used based on further monitoring of device activity.

Figure 3B:
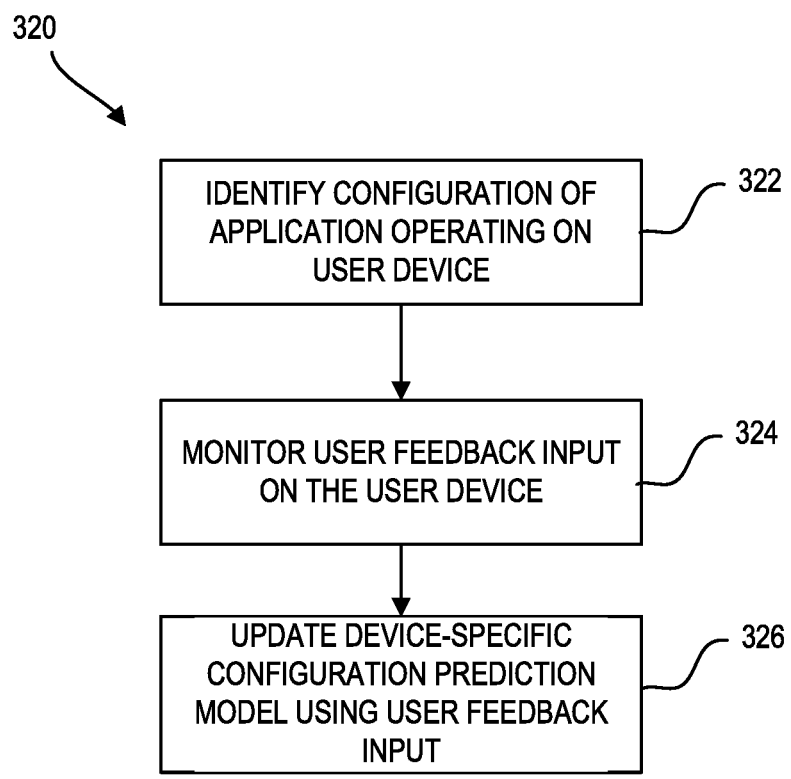
FIG. 3B is a flowchart illustrating a method for updating a configuration prediction model using user feedback input in accordance with an example embodiment.

Referring now to FIG. 3B, shown therein is a flowchart illustrating a method 320 for assessing user feedback input. The method 320 may be carried out by various components of the systems 100 and 220, such as the configuration monitoring program 218 operating on a user device 115.

At 322, the configuration monitoring program 218 can identify the configuration of the application currently operating on the user device 115. Additionally, the configuration monitoring program 218 may also identify the predicted device-specific configuration generated by the combined prediction model used by configuration monitoring program 218.

At 324, the configuration monitoring program 218 can monitor user feedback input corresponding to the configuration of the application. This may involve monitoring whether the user selects a suggested configuration, or otherwise selects a different configuration for the application. User feedback input may also include various user engagement metrics. The user feedback input can then be stored on the memory 216 of the user device 115 (i.e. included as part of the local device data).

At 326, the configuration monitoring program 218 can update (or re-train) the device-specific configuration prediction model (i.e., local prediction model) using the user feedback input received at 324. The local prediction model can be re-trained using the updated local user data that now includes the user feedback input.

The configuration monitoring program 218 may be configured to monitor historical device data that includes user interaction data, application configuration data and predicted device-specific configuration data. By monitoring and evaluating historical user interaction data and application configuration data over a period of time, the configuration monitoring program 218 may identify changes in user interactions or user engagement with the application. The configuration monitoring program 218 may be able to correlate these changes with corresponding changes in the application configuration data.

The configuration monitoring program 218 may be configured to update the local prediction model on an ongoing and continual basis. In some cases, the configuration monitoring program may update the local prediction model at regular intervals based on the device data monitored during that interval.

In some cases, the configuration monitoring program 218 may be configured to update the local prediction model based on accuracy metrics collected for the local prediction model. For example, the configuration monitoring program 218 may determine that the accuracy of the local prediction model has decreased more than a defined re-training threshold or to an accuracy below a training threshold. The configuration monitoring program 218 may then re-train the local prediction model. The configuration monitoring program 218 may continue to re-train the local prediction model until a desired prediction accuracy is reached.

Figure 4A:
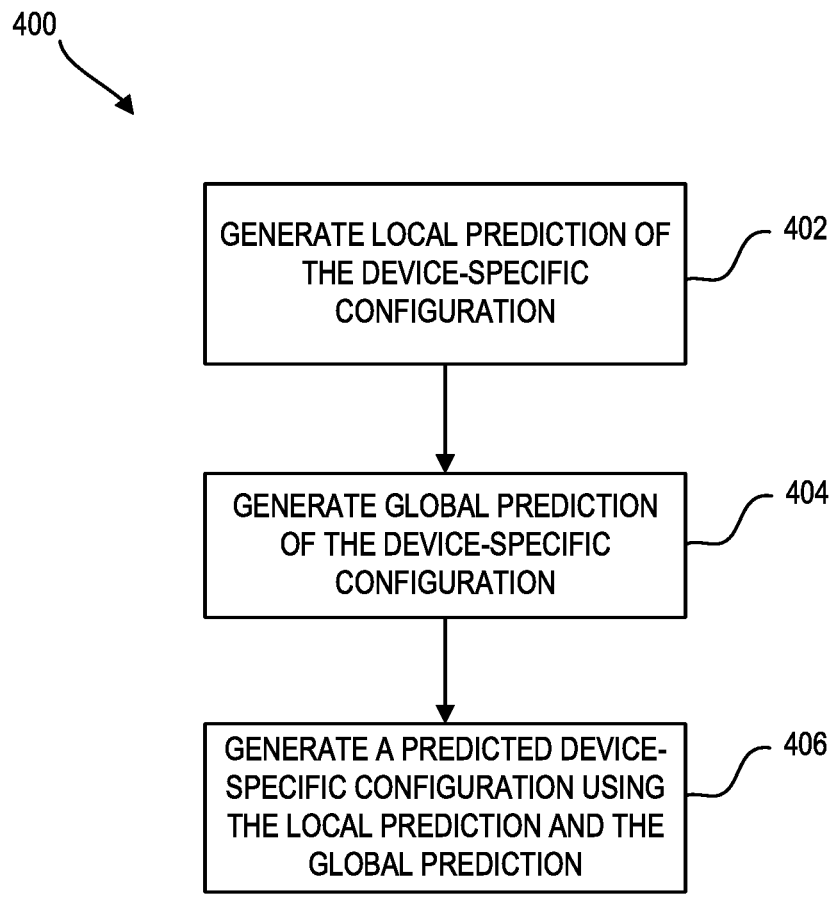
FIG. 4A is a flowchart illustrating a method for generating a predicted device-specific configuration for a software application in accordance with an example embodiment.

Referring now to FIG. 4A, shown therein is a flowchart illustrating a method 400 for generating a predicted device-specific configuration, according to some embodiments. Method 400 may be carried out by various components of the systems 100 and 220, such as the configuration monitoring program 218 operating on a user device 115. Method 400 is an example process for generating a predicted device-specific configuration that may be used at step 312 of method 300.

At 402, the configuration monitoring program 218 can use the local prediction model to generate a local prediction for the device-specific configuration. The local prediction may provide a predicted configuration that may be more tailored to the user device 115, as it is generated using a model developed using only local data.

At 404, the configuration monitoring program 218 can use the global prediction model received from the server to generate a global prediction for the device-specific configuration. The global prediction may provide a more generalized prediction of the application configuration on the device. The global prediction may supplement the local prediction while the local prediction model is insufficiently trained (e.g. there is insufficient local data available to generate an accurate local prediction model or the local data is inconsistent).

In some embodiments, where the global prediction model includes a set of default variations, the global prediction model may otherwise generate a default or baseline prediction for the configuration of the application.

At 406, the predicted device-specific configuration can be generated using the local and global predictions of the device-specific configuration. As discussed herein with reference to FIGS. 4B to 4D, various methods are available for using or combining the local and global predictions to generate the predicted device-specific configuration. In some cases, the device-specific predicted configuration may be generated as one of the local prediction and the global prediction while the other of the local prediction and the global prediction is given no weight in the final device-specific prediction configuration. In other cases, the device-specific predicted configuration may be generated using a combined prediction.

Figure 4B:
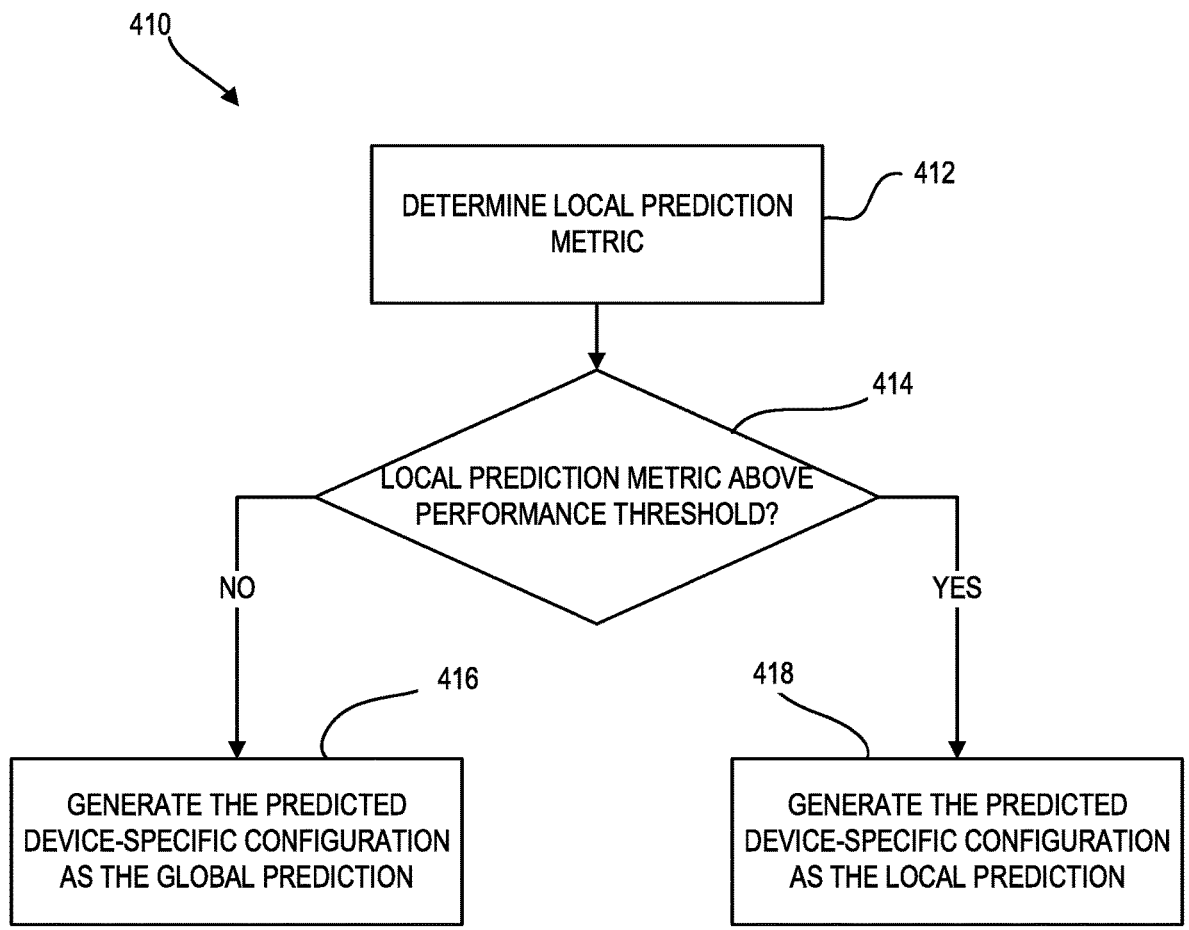
FIG. 4B is a flowchart illustrating a method for generating a predicted device-specific configuration for a software application using a local prediction metric in accordance with an example embodiment.

Referring now to FIG. 4B, there is shown a flowchart illustrating a method 410 for generating the predicted device-specific configuration using the local and global predictions in accordance with an embodiment. Method 410 may be carried out by various components of the systems 100 and 220, such as the configuration monitoring program 218 operating on a user device 115. Method 410 is an example process for generating a predicted device-specific configuration based on accuracy metrics of the local prediction model that may be used at step 406 of method 400.

At 412, the configuration monitoring program 218 can determine a local prediction metric. The local prediction metric may be a value, or set of values, that express or reflect the historical accuracy of the local prediction model. The accuracy of the local prediction can be determined by comparing the local prediction with monitored device data such as the user feedback input received at step 324. The local prediction metric may then be compared to an accuracy threshold to determine whether the local prediction model has been sufficiently trained.

In some embodiments, the local prediction metric can be determined on a rolling average basis. For example, the local prediction metric can be determined based on the performance accuracy of the local prediction model over the last three iterations of the method 300. In other cases, the local prediction metric may be determined using more complex metric algorithms.

In general, the local prediction metric can be generated using any one of a number of suitable tests for determining machine learning algorithm accuracy. For example, where the local machine learning algorithm is a classification algorithm, the local prediction metric can be generated (or determined) using, for example, precision recall, an F1 score, a true positive test, a false positive test, or a receiver operating characteristic under the curve test. In other cases, where the local machine learning algorithm is a regressor algorithm, the local prediction metric may be determined using, for example, a mean absolute error test, a measured squared error test, or an R2 score.

In various embodiments, irrespective of how the local prediction metric is determined, the local prediction metric may be expressed as a scaled value. For example, a higher prediction metric may indicate a higher performance accuracy for the local prediction model, and a lower prediction metric may indicate a lower performance accuracy for the local prediction model.

At 414, the configuration monitoring program 218 can determine if the local prediction metric is above a predetermined performance threshold (i.e., whether the local prediction model is sufficiently accurate).

In some cases, the performance threshold may be a value generated and transmitted by the global configuration program 238 to the configuration monitoring program 218. In other cases, the configuration monitoring program 218 may itself be configured with a value for the performance threshold. The value of the performance threshold can also vary depending on the particular software application at issue, or the type of configuration being determined for that application. For example, the developer of a software application may adjust the accuracy threshold within the configuration monitoring program 218 deployed with that application.

At 416, if the value of the local prediction metric is determined to be below the performance threshold, then the configuration monitoring program 218 can determine that the local prediction model is insufficiently accurate (i.e., insufficiently trained). In this case, the configuration monitoring program 218 can generate the predicted device-specific configuration using only the global prediction of the device-specific configuration (i.e. the output from the global prediction model). The local prediction may still be recorded by the configuration monitoring program 218 and stored on memory 216. The recorded local prediction may then assessed against the user-feedback input to re-train the local prediction model.

Conversely, if at 414, the local prediction metric is determined to be above the predetermined performance threshold, then at 418, the configuration monitoring program 218 can determine that the local prediction model is sufficiently accurate (i.e. sufficiently trained). In this case, the configuration monitoring program 218 can generate the predicted device-specific configuration using only the local prediction.

In general, in method 410 the global (or default) prediction may operate as a back-up (or an alternate option) to the local prediction unless and until the local prediction model becomes sufficiently accurate. In some cases, while the local prediction metric may exceed the performance threshold in some iterations of method 410, the configuration monitoring program 218 may revert to using the global (or default) prediction where the local prediction accuracy metric decreases to below the desired performance threshold.

Figure 4C:
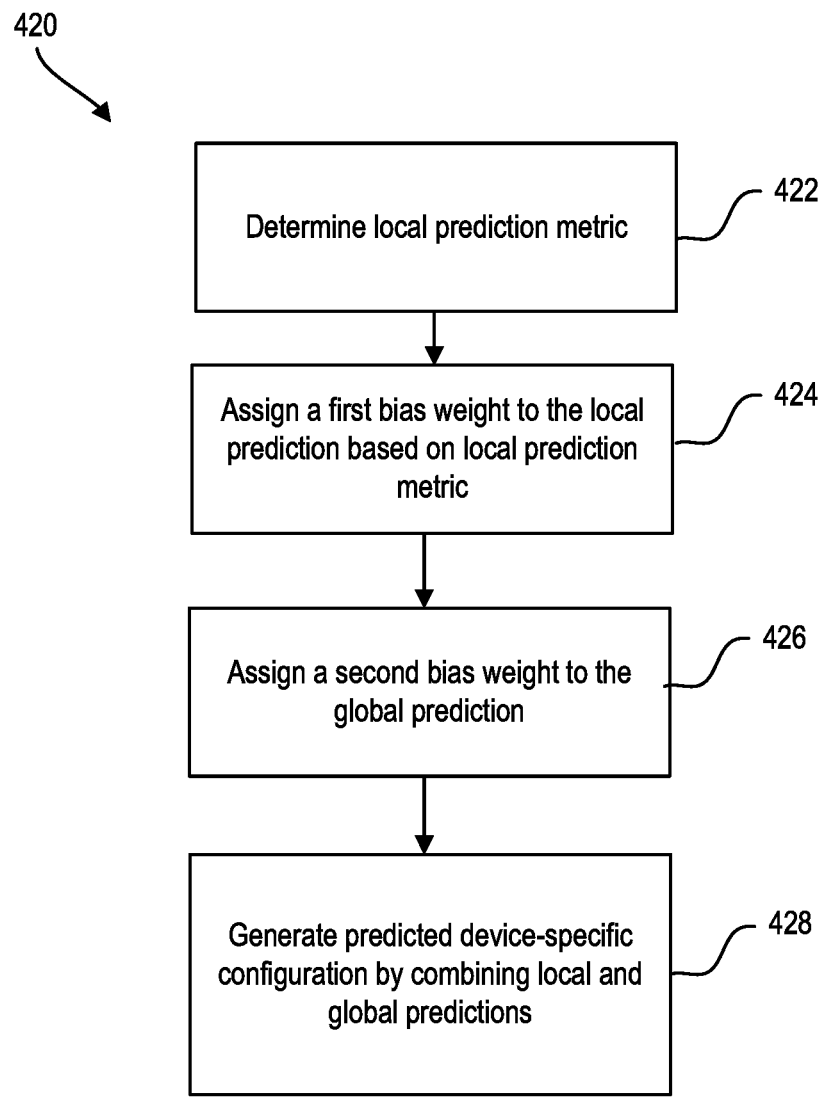
FIG. 4C is a flowchart illustrating a method for generating a predicted device-specific configuration for a software application by combining weighted local and global predictions in accordance with an example embodiment.

Referring now to FIG. 4C, there is shown a flowchart illustrating a method 420 for generating the predicted device-specific configuration using the local and global predictions in accordance with an embodiment. Method 420 may be carried out by various components of the systems 100 and 220, such as the configuration monitoring program 218 operating on a user device 115. Method 420 is an example process for generating a predicted device-specific configuration by combining weighted predictions from the local and global models that may be used at step 406 of method 400.

At 422, the configuration monitoring program 218 can again determine a local prediction metric. The local prediction metric may be determined in the same manner as described above at 412.

At 424, the configuration monitoring program 218 can assign a local bias weight to the local prediction based on the local prediction metric. The local bias weight may be used to scale or adjust the importance of the local prediction. For example, a higher local prediction metric (i.e., a higher local prediction model accuracy) may result in a higher bias weight being assigned to the local prediction, while a lower local prediction metric (i.e., a lower local prediction model accuracy) may result in a lower bias weight being assigned to the local prediction.

At 426, the configuration monitoring program 218 can assign a second bias weight to the global prediction of the device-specific configuration. In some cases, the second bias weight may be determined a function of the first bias weight. For example, the first and second bias weights may be collectively defined to provide percentage weightings that total to 100%.

At 428, the configuration monitoring program 218 can generate the predicted device-specific configuration by combining the local prediction and the global prediction according to their respective bias weightings (e.g. First Bias Weight*Local Prediction+Second Bias Weight*Global Prediction). Accordingly, the predicted device-specific configuration is generated from a mixed weighted combination of the local and global predictions. In this manner, inaccuracy in the local prediction model can be mitigated by the combining of the global and local predictions in proportion to their bias weightings.

Figure 4D:
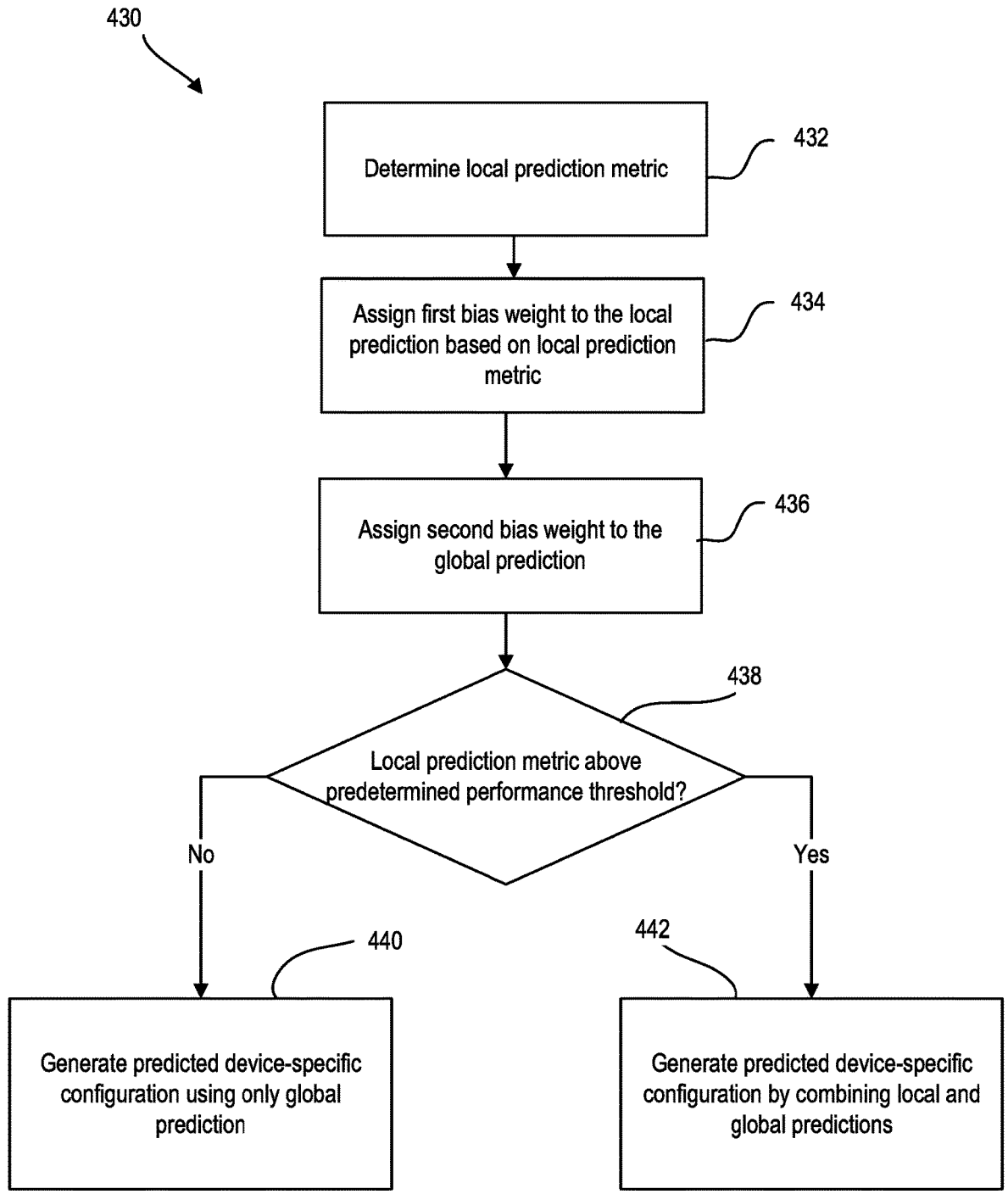
FIG. 4D is a flowchart illustrating a method for generating a predicted device-specific configuration for a software application using a local prediction metric in accordance with an example embodiment.

Referring now to FIG. 4D, there is shown a flowchart illustrating a method 430 for generating the predicted device-specific configuration using the local and global predictions in accordance with an embodiment. Method 430 may be carried out by various components of the systems 100 and 220, such as the configuration monitoring program 218 operating on a user device 115. Method 430 is an example process for generating a predicted device-specific configuration using local prediction metrics and weighted predictions that may be used at step 406 of method 400.

At 432, 434 and 436, the configuration monitoring program again determines the local prediction metric, and proceeds to assign a first bias weight to the local prediction based on the local prediction metric, and a second bias weight to the global prediction in the same manner as described above in steps 422, 424 and 426.

At 438, the configuration monitoring program 218 can determine if the local prediction metric is above the predetermined performance threshold. This determination may occur in the same manner as described above at step 414.

If at 438 it is determined that the local prediction metric is below the predetermined performance threshold, the configuration monitoring program 218 can determine that the local prediction is insufficiently trained. Accordingly, at 440, the configuration monitoring program 218 can generate the predicted device-specific configuration using only the global (or default) prediction. In this case, the configuration monitoring program 218 may record and store the local prediction in order to re-train the local prediction model. Thus, when the local prediction metric is below the predetermined threshold, method 430 may result in the same predicted device-specific configuration as method 410.

If at 438, it is determined that the local prediction metric is above (or greater) than the predetermined performance threshold, then at 442, the configuration monitoring program 218 can generate the predicted device-specific configuration by combining the local and global predictions according to the first and second bias weights, respectively. Thus, when the local prediction metric is above the predetermined threshold, method 430 can result in the same predicted device-specific configuration as method 420.

Accordingly, in method 430, the mixed combination of the local and global predictions is generated only when the local prediction model is determined to be sufficiently accurate. This may ensure that the result of the mixed weighting is not compromised by an insufficiently trained local prediction model.

In general, in method 430 the global (or default) prediction may operate as a back-up (or an alternate option) to the blended weighted local and global prediction unless and until the local prediction model becomes sufficiently accurate. In some cases, while the local prediction metric may exceed the performance threshold in some iterations of method 430, the configuration monitoring program 218 may revert to using the global (or default) prediction where the local prediction accuracy metric decreases to below the desired performance threshold.

Further, it will also be appreciated that the conditional logic in methods 410 and 430 (i.e. 414 and 438 which depend on the local prediction metric) may be, in some cases, over-ridden by a third-party administrator (i.e., an application developer) to force the method to adopt a desired outcome.

Figure 5:
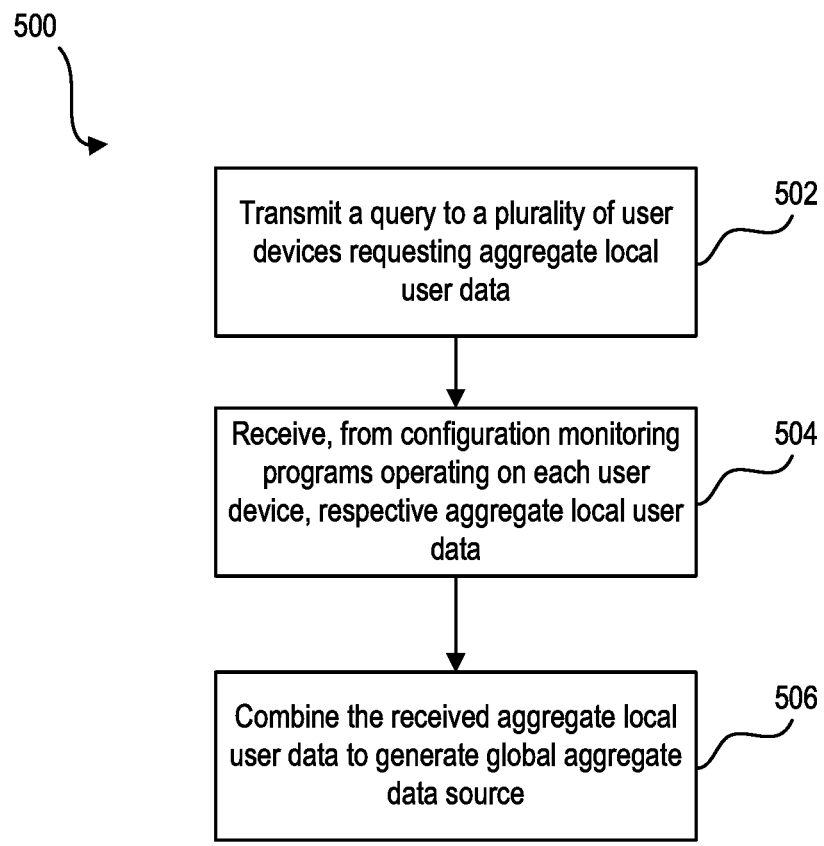
FIG. 5 is a flowchart illustrating a method for acquiring aggregate user data from one or more user devices in accordance with an example embodiment.

Referring now to FIG. 5, shown therein is a flowchart illustrating a method 500 for acquiring data from one or more user devices 115. Method 500 is an example process for acquiring device data that can be used to generate an anonymized aggregate data source. The method 500 may be carried out by various components of the systems 100 and 220, such as the global configuration program 238 operating on the server 105.

At 502, the global configuration program 238 can generate a data request query. The server 105 can then transmit the data request query to one or more user devices 115 requesting local device data. The data request query generated by the global configuration program 238 can be modified (or otherwise filtered or restricted) to request only anonymized aggregate local device data. In some cases, the queries may be restricted to request only cumulative statistics in respect of an application operating on the user device 115 (e.g., total counts, or total probabilities). For example, the request may be in respect of the probability that a user selects a particular configuration based on previously available data. In other cases, the queries may be restricted to request only training weights generated by partially trained local machine learning algorithms operating on user devices 115. In this manner, the queries can exclude requests for data that include sensitive or personally identifiable information (PII) of the user of the user device 115 (i.e., time-stamped discrete or singular events).

In various embodiments, the queries may generated by the global configuration program 238 using structured query language (SQL), or any other suitable query generating language. The queries may be transmitted to the user devices 115 as silent pushes.

The configuration monitoring program 218 may, in response to the query, scan the local device data (i.e., stored on memory 216) in order to gather the queried data. In some cases, the configuration monitoring program 218 can collect or group the local device data in order to generate cumulative data to be transmitted to the server 105. The configuration monitoring program 218 may also evaluate the stored device data to determine aggregate device data, such as the probability of certain events occurring on the device 115. The configuration monitoring program 218 may then transmit the collected data to the server 105.

At 504, the global configuration program 238 receives the requested aggregate data from one or more user devices 115. The aggregate data may then be stored in memory 236.

In some cases, the global configuration program 238 may evaluate the received aggregate data to ensure that only anonymized aggregate data was received. The global configuration program 238 may discard, and dispose of, any non-anonymized data received to reduce the possibility of that data being comprised.

At 506, the global configuration monitoring program 238 can aggregate or combine the received data from the user devices 115 to generate an aggregate data source. The aggregate data source may then be used to generate a global configuration model of the device-specific configuration for a particular application.

In some cases, the aggregate data source may be specific to a particular application. That is, data relate to an individual application may be stored in a separate aggregate data source for that application. In other cases, the aggregate data source may include data related to multiple different software application.

In some cases, the aggregate data source may group application data based on an application type. For example, aggregate data related to messaging applications may be stored in a first aggregate data source while aggregate data related to a media playback application may be stored in a second aggregate data source. This may allow aggregate data from different applications of the same application type to be used to define a global prediction model for individual applications of that application type.

As used herein, the wording "and/or" is intended to represent an inclusive—or. That is, "X and/or Y" is intended to mean X or Y or both, for example. As a further example, "X, Y, and/or Z" is intended to mean X or Y or Z or any combination thereof.

While the above description describes features of example embodiments, it will be appreciated that some features and/or functions of the described embodiments are susceptible to modification without departing from the spirit and principles of operation of the described embodiments. For example, the various characteristics which are described by means of the represented embodiments or examples may be selectively combined with each other. Accordingly, what has been described above is intended to be illustrative of the claimed concept and non-limiting. It will be understood by persons skilled in the art that other variants and modifications may be made without departing from the scope of the invention as defined in the claims appended hereto. The scope of the claims should not be limited by the preferred embodiments and examples, but should be given the broadest interpretation consistent with the description as a whole.

The invention claimed is:

1. A method for automatically determining a device-specific configuration for a given application operating on a user device, the user device having a processor, a non-transitory memory and a configuration monitoring program stored in the non-transitory memory, the method comprising:
installing a configuration monitoring program on the user device;
monitoring, by the configuration monitoring program, local user data stored in the non-transitory memory of the user device;
generating, by the configuration monitoring program on the user device, a device-specific configuration prediction model, wherein the device-specific configuration prediction model is generated using a machine learning algorithm applied to the monitored local data;
receiving, by the configuration monitoring program on the user device, a global configuration prediction model, wherein the global configuration prediction model is generated remotely using global user data collected from a plurality of user devices;
defining, by the configuration monitoring program, a predicted device-specific configuration of the given application operating on the user device by:

generating, by the configuration monitoring program using the device-specific configuration prediction model, a local prediction of the device-specific configuration;

generating, by the configuration monitoring program using the global configuration prediction model, a global prediction of the device-specific configuration; and generating, by the configuration monitoring program, the predicted device-specific configuration of the given application using the local prediction of the device-specific configuration and the global prediction of the device-specific configuration; and updating the configuration of the given application using the predicted device-specific configuration.

2. The method of claim 1, further comprising:

monitoring, by the configuration monitoring program, device activity of the user device;

identifying, by the configuration monitoring program, that configuration update criteria have been satisfied based on the device activity; and updating the configuration of the given application using the predicted device-specific configuration, in response to identifying that the configuration update criteria have been satisfied.

3. The method of claim 2, further comprising:

defining, by the configuration monitoring program, the predicted device-specific configuration in response to identifying that the configuration update criteria have been satisfied.

4. The method of claim 1, wherein the global user data comprises anonymized aggregate data collected from a plurality of user devices while omitting personally identifiable information.

5. The method of claim 1, wherein the configuration monitoring program is installed on a plurality of user devices, and the method further comprises:

transmitting a query to the plurality of user devices, wherein the query includes a request for aggregate local user data;

receiving, from the configuration monitoring program operating on each of the plurality of user devices, respective aggregate local user data generated locally by the configuration monitoring program on each user device from the local data stored on that user device; and combining the aggregate local user data received from the plurality of user devices to generate global aggregate user data.

6. The method of claim 5, wherein the configuration monitoring program on each user device is configured to generate model weights for the device-specific configuration prediction model, and the aggregate local user data received from the plurality of user devices comprises the model weights.

7. The method of claim 1, further comprising:

monitoring, by the configuration monitoring program, a user feedback input corresponding to the configuration of the given application; and updating the device-specific configuration prediction model using data corresponding to the user feedback input.

8. The method of claim 7, further comprising:

determining, by the configuration monitoring program, a local model prediction metric using the local prediction of the device-specific configuration and the user feedback input.

9. The method of claim 8, wherein the local model prediction metric is determined by the configuration monitoring program using historical metric results.

10. The method of claim 8, wherein generating the predicted device-specific configuration of the given application comprises:

determining whether the local prediction metric is above a predetermined performance threshold; and when the local prediction metric is above the predetermined performance threshold, generating the predicted device-specific configuration of the given application entirely from the local prediction and giving the global prediction no weight, otherwise generating the predicted device-specific configuration of the given application entirely from the global prediction and giving the local prediction no weight.

11. The method of claim 8, wherein generating the predicted device-specific configuration of the given application comprises:

assigning a first bias weight to the local prediction, wherein the first bias weight is based on the local prediction metric;

assigning a second bias weight to the global prediction; and generating the predicted device-specific configuration by combining the local prediction and the global prediction according to the first and second bias weights, respectively.

12. The method of claim 11, further comprising:

determining whether the local prediction metric is above a predetermined performance threshold; and generating the predicted device-specific configuration using only the global prediction if the local prediction metric is below the predetermined performance threshold, otherwise generating the predicted device-specific configuration by combining the local prediction and the global prediction weighted according to the first and second bias weights respectively.

13. The method of claim 1, wherein the global data includes a plurality of default configured outcomes.

14. The method of claim 1, wherein the configuration monitoring program automatically updates the configuration of the given application using the predicted device-specific configuration.

15. A system for automatically determining a device-specific configuration for a given application operating on a first user device, the system comprising:

a plurality of user devices including the first user device, each user device having a processor, a non-transitory memory and a configuration monitoring program stored in the non-transitory memory;

a server in communication with the plurality of user devices, wherein the server is configured to:

collect global user data from the plurality of user devices; and generate a global configuration prediction model using the global user data; and the first user device is configured by the configuration monitoring program to:

monitor local user data stored in the non-transitory memory of the first user device;

generate a device-specific configuration prediction model, wherein the device-specific configuration prediction model is generated using a machine learning algorithm using the monitored local data;

receive the global configuration prediction model from the server;

define a predicted device-specific configuration of the given application operating on the first user device by:
    generating, using the device-specific configuration prediction model, a local prediction of the device-specific configuration;
    generating, using the global configuration prediction model, a global prediction of the device-specific configuration; and
    generating the predicted device-specific configuration of the given application using the local prediction of the device-specific configuration and the global prediction of the device-specific configuration; and
update the configuration of the given application using the predicted device-specific configuration.

16. The system of claim 15, wherein the first user device is further configured by the configuration monitoring program to:
    monitor device activity of the first user device;
    identify that configuration update criteria have been satisfied based on the device activity; and
    update the configuration of the given application using the predicted device-specific configuration, in response to identifying that the configuration update criteria have been satisfied.

17. The system of claim 16, wherein the first user device is further configured by the configuration monitoring program to:
    define the predicted device-specific configuration in response to identifying that the configuration update criteria have been satisfied.

18. The system of claim 15, wherein the server is configured to collect the global user data as anonymized aggregate data that omits personally identifiable information.

19. The system of claim 15, wherein the server is configured to:
    transmit a query to the plurality of user devices, wherein the query includes a request for aggregate local user data;
    receive, from the configuration monitoring program operating on each of the plurality of user devices, respective aggregate local user data generated locally by the configuration monitoring program on each user device from the local data stored on that user device; and
    combine the aggregate local user data received from the plurality of user devices to generate the global user data as global aggregate user data.

20. The system of claim 19, wherein the configuration monitoring program on each user device is configured to generate training weights for the device-specific configuration prediction model, and the aggregate local user data received from the plurality of user devices comprises the training weights.

21. The system of claim 15, wherein the first user device is further configured by the configuration monitoring program to:
    monitor a user feedback input corresponding to the configuration of the given application; and
    update the device-specific configuration prediction model using data corresponding to the user feedback input.

22. The system of claim 21, wherein the first user device is further configured by the configuration monitoring program to:
    determine a local model prediction accuracy using the local prediction of the device-specific configuration and the user feedback input.

23. The system of claim 22, wherein the local model prediction accuracy is determined by the configuration monitoring program on a rolling average basis.

24. The system of claim 22, wherein generating the predicted device-specific configuration of the given application comprises:
    determining whether the local prediction accuracy is above a predetermined performance threshold; and
    when the local prediction accuracy is above the predetermined performance threshold, generating the predicted device-specific configuration of the given application entirely from the local prediction and giving the global prediction no weight, otherwise generating the predicted device-specific configuration of the given application entirely from the global prediction and giving the local prediction no weight.

25. The system of claim 22, wherein generating the predicted device-specific configuration of the given application comprises:
    assigning a first bias weight to the local prediction, wherein the first bias weight is based on the local prediction accuracy;
    assigning a second bias weight to the global prediction; and
    generating the predicted device-specific configuration by combining the local prediction and the global prediction according to the first and second bias weights, respectively.

26. The system of claim 25, wherein the first user device is further configured by the configuration monitoring program to:
    determine whether the local prediction accuracy is above a predetermined performance threshold; and
    generate the predicted device-specific configuration using only the global prediction if the local prediction accuracy is below the predetermined performance threshold, otherwise generating the predicted device-specific configuration by combining the local prediction and the global prediction weighted according to the first and second bias weights respectively.

27. The system of claim 15, wherein the global data includes a plurality of default data outcomes.

28. The system of claim 15, wherein the configuration monitoring program automatically updates the configuration of the given application using the predicted device-specific configuration.

* * * * *